Patented Dec. 6, 1949

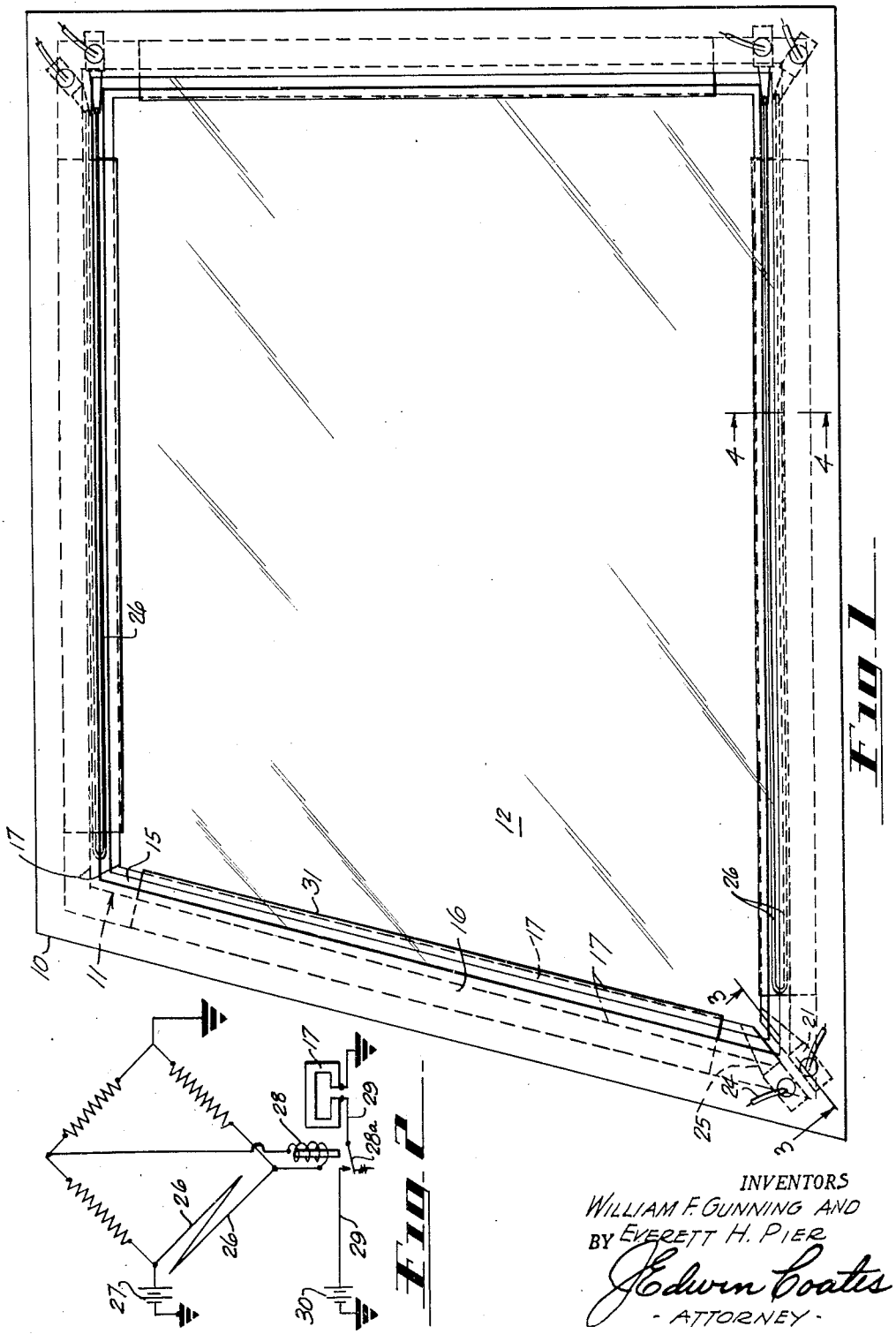

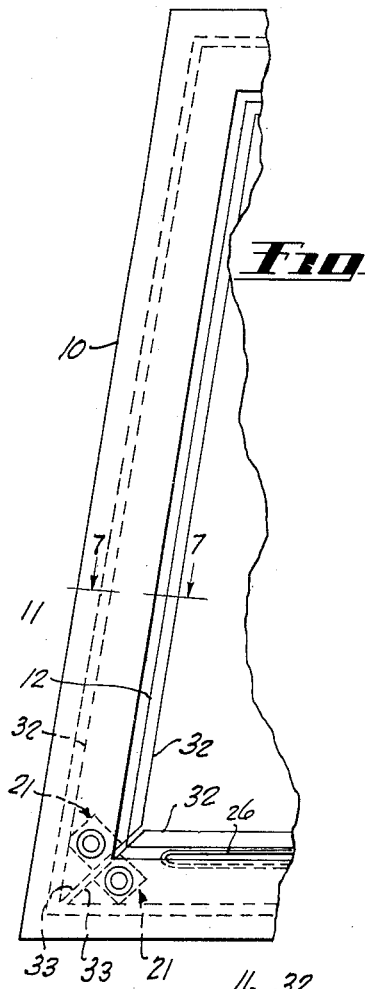
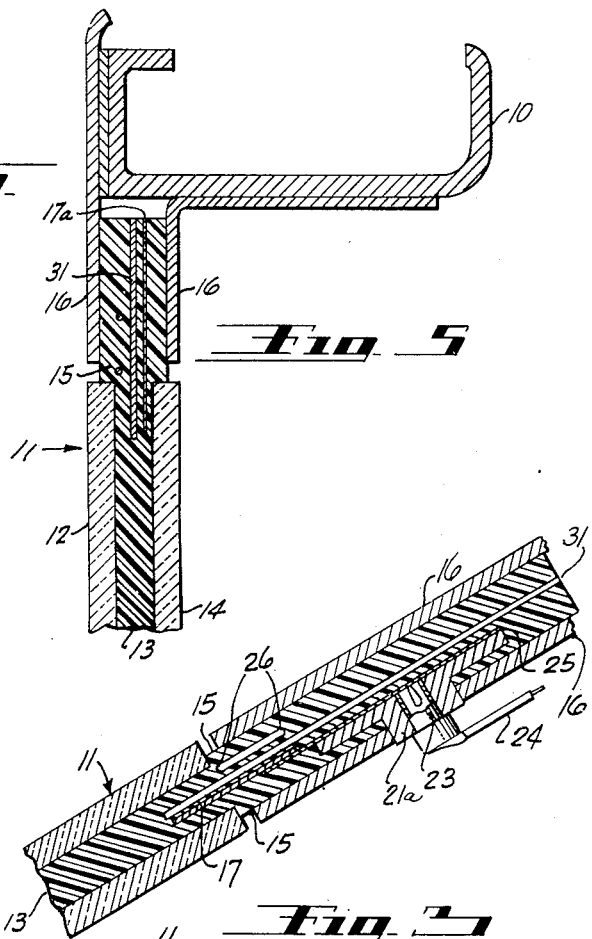
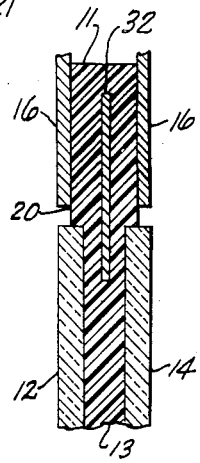
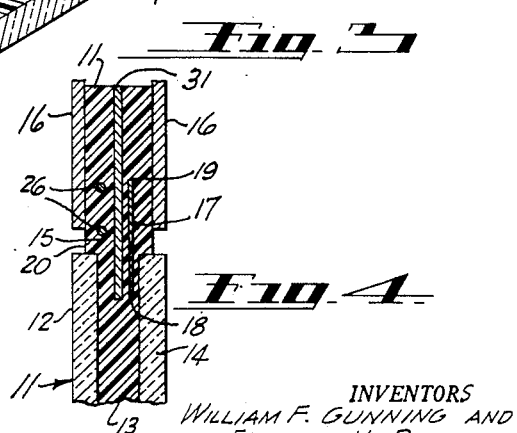

2,490,433

UNITED STATES PATENT OFFICE 2,490,433

ELECTRICAL HEATED WINDSHIELD

William F. Gunning and Everett H. Pier, Los Angeles, Calif., assignors to Douglas Aircraft Company, Inc., Santa Monica, Calif.

Application August 28, 1948, Serial No. 46,667

11 Claims. (Cl. 219—19)

This invention relates to windshields for vehicles, particularly those operating in extremely low atmospheric temperatures and in high speed airstreams and which are apt to be impacted by airborne objects. Although particularly well adapted for use on aircraft, the windshield of this invention can, as will hereinafter become apparent, be advantageously incorporated in any type of vehicle subject to such conditions.

Contemporary aircraft windshields essentially comprise a transparent laminated panel adapted to be mounted in the frame of the vehicle. The panel usually consists of a sheet of polyvinyl butyral sandwiched between two plates of tempered glass, the glass plates being of equal area but smaller in area than that of the polyvinyl. The butyral thus protrudes from between the glass sheets and extends outwardly beyond and around the peripheries of these sheets, forming a plastic peripheral margin on the panel. The panel is mounted in a frame member by means of this margin.

Although means can be provided for heating the glass sheets, and that portion of the butyral which is encompassed by the glass sheets, in order to prevent the formation on the panel of ice or water in any of its forms and to render it impact resistant, such means have heretofore been incapable of applying heat throughout the marginal portion of the butyral interlayer. As a consequence, this margin can become quite cold, by heat transfer to the ambient atmosphere through the metallic frame, sometimes dropping to a temperature at which the margin, because of the composition thereof, becomes quite brittle and frangible, and hence is apt to break out of the frame under air pressure or under the impact of airborne objects. Anti-shear strips have been embedded in this margin in an attempt to reinforce the same against these forces but despite the presence of these strips, the margin may become so brittle at low temperatures as to break out of the frame, especially under extreme airstream pressures or under the impact of airborne objects.

The windshield of the present invention entirely overcomes these difficulties, although the panel is still basically constructed of two sheets of tempered glass embracing a larger sheet of polyvinyl butyral. It thus includes a wide peripheral margin of butyral by which the panel can be mounted in a metallic, or other type of frame. According to the present invention, however, this marginal portion of the butyral sheet is maintained at a temperature at which it is non-brittle and tough, and thus has a high impact strength. It hence resists disintegration and remains whole and integral under substantially all conditions normally to be expected in flight.

Preferably, this margin is maintained substantially at the same temperature as that at which the rest of the butyral sheet is maintained by the anti-icing heating means disclosed in the co-pending application of E. H. Plesset and J. D. McCrumm, "De-icing windshield," Serial Number 45,644, filed August 23, 1948, to obviate creating a temperature differential between the margin and the body of the butyral sheet which might result in warping or sagging and other thermal distortion of the sheet.

In one of the now preferred embodiments of the invention, a resistance member in the form of a substantially annular, bi-terminus or circumferentially interrupted body or ring of electrically conductive, resistance-heatable material, such as a flat ribbon of Nichrome or its equivalent, is circumscribingly embedded in the margin of the butyral sheet parallel to its faces and has two adjacent ends suitably connected to a source of electrical energy. The Nichrome ribbon is disposed nearer the rear face of the butyral sheet than the front face, in order to apply heat to the portion of the butyral that lies most distant from the electrically heated portion of the windshield. The ring lies preferably outwardly of the inner periphery of the anti-shear plates to leave the pilot's view field unobscured. It may extend outwardly as far as may be necessary to heat the marginal portion of the butyral sheet by the use of a relatively low voltage. The two adjacent ends of this circumscribing heat applying ring are preferably connected to the energy source by suitable electrical terminals for applying a relatively low voltage electric heating current to the body and the conductors of the current applying means lead directly to the source of electrical energy which is disposed in a convenient location in the vehicle.

In another embodiment, the resistance member may take the form of a metallic strip of such a composition and of such a width, thickness and configuration as to reinforce the butyral margin against shear and other forces, thus serving not only as a margin heater but also obviating the aforementioned anti-shear plates hereinbefore provided in the margin adjacent to the guard ring ribbon.

Several embodiments of these and other concepts are illustrated by way of example only in the accompanying drawings and described hereinafter in conjunction therewith. It is to be understood, however, that the concepts may be equally well embodied in any form of construction lying within the scope of the annexed claims.

In these drawings:

Figure 1 is a front view of the preferred form of panel mounted in the frame of the vehicle;

Figure 2 is a diagrammatic view of a control device employable for energizing the heating element in response to variations in the temperature of the butyral margin of the windshield panel;

Figure 3 is a fragmentary section on line 3—3 of Figure 1;

Figure 4 is a fragmentary section on line 4—4 of Figure 1;

Figure 5 is a fragmentary section of a modified form of the invention taken transversely of an edge portion of the assembly and including the supporting frame;

Figure 6 is a fragmentary rear view of another modified form of the invention, including the frame, and Figure 7 is a fragmentary section on line 7—7 of Figure 6.

The construction shown in Figures 1 to 5 inclusive, includes a cockpit enclosure frame 10 supporting a windshield panel 11. The panel is a transparent laminate made up of an outer sheet 12 of glass, preferably tempered; an intermediate plastic sheet 13, preferably composed of polyvinyl butyral, and an inner sheet 14 of glass, preferably tempered.

The area of the butyral sheet 13 is considerably greater than that of the glass sheets embracing the same, thus providing a peripheral margin 15 of butyral by which the panel is mounted in the cockpit enclosure frame by the flanges 16 thereof. The peripheral margin 15 of the panel, being exposed to direct contact with both the relatively cold ambient atmosphere and the heat absorbing flanges of the supporting frame and being incapable of maintenance by any known means at the same temperature as that of the body portion of the butyral sheet, quite often falls to a temperature approaching that of the ambient atmosphere. Consequently the butyral margin often becomes quite brittle and frangible.

In order to maintain the margin 15 in a tough, relatively resilient condition and to enable it to resist impacts and other stresses and high airstream pressures, the present invention provides in association with the butyral sheet and preferably disposed in generally circumscribing relationship with the margin of the panel and lying, as shown in Figures 1 and 4, within the general region extending radially from a point inwardly of the periphery of the laminated portion of the panel to a point spaced inwardly of the peripheral edge thereof, an electrical resistance member in the form of a flat, narrow, metallic band configured to the form of a rectangular annulus discontinuous in the one locality to constitute a divided or bi-terminus element or ring 17 to which current can be applied to constitute it an electrically conductive resistance-heatable guard ring. The metallic substance may consist of any class of metal but preferably consists of an alloy in the class of Nichrome. More specifically, the rectangular, flat annulus or ring 17 is embedded in the butyral sheet with its opposite faces lying in parallelism to the adjacent one of the faces of the butyral sheet, with the provision, however, that the band preferably lie nearer the rear face of the butyral sheet than the front face thereof. The ring 17, as shown in Figures 1 and 4, extends radially outwardly in the butyral sheet from a point 18 where the peripheral portion of the butyral sheet begins to rapidly lose heat, to a point 19 in the butyral margin where, because of its direct contact with the air and with the metallic frame, the butyral is likely to become most brittle and to be subject to the greatest mechanical and thermal stresses. It is contemplated by the invention, however, that, if desired, the guard ring may extend radially outwardly to the very edge of the butyral sheet lying between the flanges 16 of the panel mounting frame, instead of its outer edge terminating as above. In either case, the heating ring is adapted to directly apply heat to the butyral margin and particularly to the gap 20 between the flanges 16 and the laminated portion of the panel. In order to provide a very firm anchorage of the inner edge of the band 17 for special uses, the inner edge of the ring 17 may, if desired, be extended considerably farther inwardly into the butyral sheet than as shown. In any case, the disposition of the band in the margin and lateral and vertical dimensions of the annulus 17, as well as its average width are such as to leave the pilot's view field substantially clear.

Each of the adjacent ends of the bi-terminus band 17 facewisely bears an electrical terminal 21 preferably of the socket and plug type embedded in the butyral sheet as shown, and formed with an opening for receiving an electrical plug 23 connected to one end of a suitable lead-wire 24. For better electrical conductivity, the inner face of the socket member 21 may be soldered to a strip of copper foil or other highly conductive material 25 disposed in angular relationship to the adjacent terminus of the heating ring 17 as shown in plan in Figure 1, the terminus of the heater ring being butt-soldered to the copper foil. Either terminus of the heater ring 17 may be employed as either an input terminal or an output terminal. The heater ring 17 is designed with such a specific resistivity and total area that a relatively low voltage may be employed to create a current density sufficiently high to maintain the butyral margin at the desired optimum temperature of approximately 110° F., thereby minimizing the electrical danger from the electrical circuits to the occupants of the space enclosed by the windshield.

Temperature measuring, or responsive, looped resistance wires 26 are embedded in the margin of the butyral sheet and lie adjacent the front face of the sheet, as shown in Figures 1 to 4 inclusive. These resistance wires are of such a composition and nature that their resistance falls when their temperature falls and vice versa. In the particular form of means shown in Figure 2, the temperature measuring resistance wires 26 are connected in series to each other to form the fourth arm of a normally balanced Wheatstone bridge which is energized from a source 27 and is connected across its upper two arms and its lower two arms to a polarizing relay 28 adapted to close, through a spring biased switch 28a, a conductor path 29 leading from an energy source 30 to the heater ring 17. When the temperature of the butyral margin falls below the optimum, the resistance of the fourth arm of the bridge correspondingly falls, unbalancing the bridge and allowing the current to close the relay, thus energizing and heating the ring 17. When the temperature of the margin rises to the optimum, the resistance wires balance the bridge and the conductor path from the source 30 is open until the temperature of the margin again drops.

For use under such low temperature conditions that a prohibitive amount of current would have to be employed to maintain the butyral margin extremely flexible or resilient, the invention contemplates the employment of auxiliary margin protective means in the form of anti-shear plates 31 to aid the heater ring by absorbing shear forces which the butyral may not be strong enough at these ultra low temperatures to absorb and dissipate by itself, unless a very high current density is employed. These plates consist of individual, rigid relatively wide and elongate rectangular strips of metal such as stainless steel or its equivalent embedded in the butyral margin medially of the thickness or fore and aft dimensions thereof, with the opposite face of each strip 31 lying in parallelism to the adjacent faces of the butyral sheet. Each strip 31 preferably extends radially of the panel from a point lying radially inwardly of the inner periphery of the heater ring to the extreme peripheral edge of the butyral margin. The strips 31 thus serve to absorb those shear forces which cannot be absorbed by the butyral and which originate perpendicularly to the outer and inner faces of the panel. The strips are especially effective in the unsupported, exposed area between the frame flanges 16 and the edges of the glass sheet laminating the main body of the butyral.

As aforementioned and as shown in detail in Figure 5, in cases where the vehicle is to operate at extremely high altitudes or in frigid latitudes, with their concomitant low temperatures or when relatively thin sheets of butyral are employed, the guard ring may take the form designated by reference character in Figure 5, 17a. In this case although the ring is still composed of metallic material such as Nichrome and conforms to its previous flat annular shape, it is given a radial width sufficient to cause it to fully occupy the radial dimension of the butyral sheet that extends from slightly inwardly of the outer periphery of the laminated portion of the panel to the extreme outer edge of the butyral margin. In short, the radial dimension of the Nichrome ring is rendered substantially equal to that of the anti-shear strips and the heater ring is disposed rearwardly of these anti-shear strips. As a consequence, heat is directly applied to the entire width of the butyral margin so that even the outer peripheral portions thereof that lie between the extremely cold metallic flanges 16 are usually prevented from becoming brittle and frangible and instead remain sufficiently resilient at the lowest temperatures to which the windshield will be exposed to resist disintegration. If desired, however, the guard-ring may be aided in resisting unusual shear-forces at extremely low temperatures by anti-shear strips 31.

In the embodiment shown in Figures 6 and 7, a member 32 is provided in substitution for separate or discrete anti-shear strips and heater ring and dually functions as both a heating element and as shear resisting means. To this end, the member 32 is disposed medially of the thickness of the butyral margin and extends from a point lying inwardly of the periphery of the laminated portion of the panel to a point spaced just inwardly of the outer edge or periphery of the butyral margin. In this embodiment of the inventive concepts and purposes, each of the adjacent ends 33 of the ring 32 bears an electrical terminal 21 such as those previously described and provided for the application of a suitable current to the dual-nature ring and reinforcer 32. Preferably also, the temperature measuring resistance wires 26, configured with bridge circuits, relays and conductor paths as described in connection with the embodiment of Figure 1 are employed to control the energization and heating of the ring 32 in accordance with the temperature of the butyral margin to maintain it at the optimum temperature for resisting disintegration.

Although certain presently contemplated configurations for accomplishing the inventive purposes have been specifically pointed out, it is to be understood that this specific disclosure has been given solely for the purpose of exemplification and clarification of the invention and that hence various other types of configurations of the elements of the invention may be employed without departing from the inventive concepts as defined in the following claims.

We claim:

1. Laminated safety glass comprising two layers of glass bonded to an intervening layer of transparent plastic material, said plastic material extending beyond the margins of the glass layer to provide a gasket portion which is resilient except at relatively low temperatures, said gasket portion being sufficiently thick and compressible to such an extent as to provide a leak-proof seal when clamped to a supporting instrumentality; and an electric resistance member disposed in said gasket portion in generally circumscribing relationship to the peripheral portion of the laminated portion of said safety glass and including means for connecting the same to a source of electrical current sufficient in intensity to heat said gasket portion to a predetermined optimum temperature on occasion, whereby to prevent disintegration of said gasket when same is exposed to temperatures below said predetermined optimum temperature.

2. A laminated transparent closure, comprising: a plurality of planes of rigid transparent material and at least one intervening layer of transparent synthetic resin-plastic bonded between adjacent surfaces of said panes and extending beyond at least one marginal edge thereof, said extended portion of the bonding layer of plastic being, except at relatively low temperatures, tough, pliant and deformable under clamping pressure to such an extent as to provide a leak-proof gasket for the transparent closure when clamped to a supporting structure; and a member of electrically conductive material disposed in said extended portion in generally circumscribing relationship to the laminate formed by said panes and said layer and including means for automatically connecting the same to a source of electrical current sufficient in intensity to heat said extended portion to a predetermined optimum temperature when it falls below said temperature, thereby to maintain said gasket tough and pliant when exposed to temperatures below said optimum temperature.

3. A sheet of transparent laminated safety glass for use in airplanes comprising two layers of glass bonded to an interlayer of transparent polymerized vinyl butyral resin which is resilient, tenacious and readily compressible except at relatively low temperatures, beyond the margins of the layers of glass to provide a resilient gasket portion, said resilient gasket portion being sufficiently thick, and compressible to such an extent, as to provide a leak-proof seal when clamped in a mounting frame structure; a member of electrically conductive material disposed in said gasket portion in generally circumscribing relationship to the peripheral portion of the laminate formed by said layers and said interlayer; and means for automatically connecting said member when the temperature of said gasket falls below a predetermined optimum temperature, to a source of electric current sufficient in intensity to heat said gasket portion to a temperature maintaining said gasket portion resilient, tenacious and readily compressible, thereby to prevent disintegration of said gasket portion at said low temperatures.

4. A sheet of transparent laminated safety glass comprising two thin layers of glass bonded to an interlayer of transparent polymerized vinyl butyral resin which is soft, pliable and resilient except at relatively low temperatures, said interlayer being of substantially greater thickness than said thin layers of glass extending beyond the margins of the layers of glass to provide a gasket portion flexible except at said temperatures, said gasket portion being sufficiently thick and normally compressible to such an extent as to provide a leak-proof seal when clamped to a supporting structure; an electrically energizable heating element disposed in said marginal portion in generally circumscribing relationship to the peripheral portion of said laminate and lying radially outwardly between said portion and said frame; and electrical energizing means automatically connectable to said heating element upon reduction of the temperature of said gasket portion below a predetermined temperature and adapted to generate sufficient heat in said heating element to maintain said gasket portion at a temperature at which it is substantially non-frangible, whereby to maintain said gasket portion integral with said sheet under substantially all normal forces applied thereto at said low temperatures.

5. A sheet of laminated safety glass comprising two layers of glass bonded to an interlayer of transparent polymerized vinyl butyral resin, said interlayer extending beyond the margins of the glass layers to provide a sealing gasket, the extended portions of said interlayer being thicker than and overlying a portion of at least one of said glass layers, said extended portion being normally compressible to such an extent as to function as a water-tight seal when clamped to a supporting structure; and a bi-terminus electric current conducting heating member grounded at the one terminus and disposed in said extended portion in generally circumscribing relationship to the laminated portion of said sheet of safety glass; a conductor path leading from an energy source to the other terminus of said heating member and including a switch normally biased open; a temperature measuring electric resistance member the resistance of which falls with fall of its temperature disposed linearly in at least one of said extended portions and forming the fourth arm of a normally balanced Wheatstone bridge; and a polarized relay connected across the opposite sides of said bridge and adapted to close said switch when the bridge is unbalanced by the fall in resistance of said resistance member; whereby said extended butyral portion is maintained at a resiliency-conferring temperature when the ambient temperature falls.

6. A substantially stress proof mount for mounting a laminated windshield panel having a plastic lamina of the type becoming brittle and non-cohesive at low temperatures and frangible under high air loads, thermal stresses and impacts, comprising: a marginal portion forming a part of the plastic lamina and protruding laterally beyond the laminate and extending peripherally of the panel; a heat conductive supporting frame surrounding said marginal portion and spaced radially of the panel from said laminate to leave a lateral and peripheral portion of the plastic margin exposed to the ambient atmosphere; a strip of electrically conductive material disposed in said marginal portion in circumscribing relationship to said panel, said strip being circumferentially discontinuous in the one location thereof; and means for supplying electrical energy to the adjacent ends of the discontinuous portion of said strip in sufficient density to heat said strip and said marginal portion to a temperature at which said plastic is substantially non-frangible; whereby to maintain said panel in an integral condition and in place in said frame under substantially all air loads, thermal stresses and impacts.

7. A substantially stress-proof mount for a laminated windshield panel including a plastic lamina of the type becoming brittle and non-cohesive at low temperatures and then being frangible by high air loads, thermal stresses, and impacts, comprising: a marginal portion forming part of the plastic lamina and protruding laterally beyond the laminate and extending peripherally of the panel; a heat conductive supporting frame surrounding said marginal portion and spaced radially outwardly of the panel from said laminate a distance such as to expose a lateral and peripheral portion of the plastic margin to the ambient atmosphere; a heating element disposed mainly in said marginal portion in circumscribing relationship to said laminate and extending across the lateral gap between said frame and said laminate; and electrical energizing means connected to said heating element and adapted to heat same sufficiently to cause same to maintain said marginal portion at a temperature at which it is substantially non-frangible; whereby to maintain said panel and said marginal portion in an integral condition and in place in said frame under substantially all operational stresses applied thereto.

8. A substantially stress-proof mount for mounting a laminated windshield panel having a plastic lamina of the type becoming brittle and non-cohesive at low temperatures and then frangible under high air loads, thermal stresses and impacts, comprising: a marginal portion forming a part of the plastic lamina and protruding laterally beyond the laminate and extending peripherally of the panel; a heat conductive supporting frame surrounding said marginal portion and spaced radially of the panel from said laminate to leave a lateral and peripheral portion of the plastic margin exposed to the ambient atmosphere; a flat annular strip of electrically conductive, thermally active material circumscribingly embedded in said marginal portion and extending laterally thereof between said frame and said laminate and circumscribing said laminate, said strip being circumferentially interrupted at the one location therein; and electrical means connected to the adjacent ends of said interrupted portion and adapted to supply current thereto of sufficient density to heat said strip and said margin to a temperature at which said pastic is tough, flexible, resilient, and substantially non-frangible; whereby to maintain said panel in an integral condition and in place in said frame under substantially all service conditions.

9. A substantially stress-proof mount for securely mounting a frangible plastic-laminated windshield panel by means of the plastic lamina despite the tendency of said plastic at low temperatures to become brittle and non-cohesive and frangible under high air loads, thermal stresses and impacts, comprising: a marginal portion forming a part of the plastic lamina and protruding laterally beyond the laminate and extending peripherally of the panel; a strip of substantially rigid material disposed in each of the sides of said marginal portion and extending from within the confines of said laminate to the peripheral edge of said marginal portion and lying substantially parallel to the opposite faces of said marginal portion, thereby to enable said portion to effectively resist shear forces applied to the opposite faces thereof; a heat-conductive panel-supporting frame surrounding said marginal portion; a heating element disposed in said marginal portion in circumscribing relationship to said panel and extending between said frame and said laminate; and energizing means connected to said heating element and adapted to generate sufficient heat therein to maintain said marginal portion substantially non-frangible; whereby to maintain said panel in an integral condition and in place in said frame under substantially all operational stresses applied thereto.

10. A substantially stress-proof mount for securely mounting a frangible plastic-laminated windshield panel by means of the plastic lamina despite the tendency of said plastic at low temperatures to become brittle and non-cohesive and frangible under high air loads, thermal stresses and impacts, comprising: a marginal portion forming a part of the plastic lamina and protruding laterally beyond the laminate and extending peripherally of the panel; a heat-conductive panel-supporting frame surrounding said marginal portion; a flat, ribbon-like strip of substantially rigid, relatively thick shear resistive electrically conductive material circumscribingly disposed in said marginal portion substantially in the form of a hollow rectangle and extending radially of said marginal portion and substantially parallel to the opposite faces thereof from the outer peripheral edge thereof inwardly into the laminate, said strip being circumferentially interrupted at the one location thereof; and electrical energizing means connected to the adjacent ends of said interrupted portion and adapted to supply heating current to said strip; whereby to dually constitute said strip a heater guard-ring for maintaining said marginal portion at a temperature at which it is substantially non-frangible and a reinforcing plate for effectively resisting shear and other forces coming on said marginal portion.

11. A substantially stress-proof mount for securely mounting a windshield including a frangible plastic-laminated windshield panel between a pair of sheets of glass, by means of the frangible plastic lamina, comprising: a marginal portion of the plastic lamina protruding laterally beyond the laminate and extending peripherally of the panel; a heat conductive supporting frame surrounding said marginal portion; a strip of substantially rigid material disposed in each of the sides of said marginal portion in parallelism with the opposite faces of said plastic lamina and extending radially of the panel from within the confines of said laminate to the peripheral edge of said marginal portion thereby to enable said portion to effectively resist shear and other forces coming thereon; a heating element disposed in said marginal portion in circumscribing relationship to said panel and extending between said frame and said laminate; and energizing means connected to said heating element and adapted to generate sufficient heat therein to maintain said marginal portion substantially non-frangible; whereby to maintain said panel in an integral condition and in place in said frame under substantially all vehicle-operational stresses applied thereto.

WILLIAM F. GUNNING.
EVERETT H. PIER.

REFERENCES CITED

The following references are of record in the file of this patent:

UNITED STATES PATENTS

| Number | Name | Date |
| --- | --- | --- |
| 1,848,337 | Franzen | Mar. 1, 1932 |
| 1,885,127 | Milette et al. | Nov. 1, 1932 |
| 2,030,117 | Page | Feb. 11, 1936 |